(12) United States Patent
Chahal et al.

(10) Patent No.: US 11,691,748 B2
(45) Date of Patent: Jul. 4, 2023

(54) REVERSE THRUST IN MULTI-ENGINE PROPELLER AIRCRAFT

(71) Applicant: PRATT & WHITNEY CANADA CORP., Longueuil (CA)

(72) Inventors: Jasraj Chahal, Lasalle (CA); Carmine Lisio, Laval (CA); Darragh McGrath, Montreal (CA); Giancarlo Zingaro, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 255 days.

(21) Appl. No.: 16/159,970

(22) Filed: Oct. 15, 2018

(65) Prior Publication Data

US 2020/0115063 A1 Apr. 16, 2020

(51) Int. Cl.
*B64D 31/12* (2006.01)
*B64C 11/30* (2006.01)

(52) U.S. Cl.
CPC .............. *B64D 31/12* (2013.01); *B64C 11/30* (2013.01)

(58) Field of Classification Search
None
See application file for complete search history.

(56) References Cited

U.S. PATENT DOCUMENTS

| | | | |
|---|---|---|---|
| 2,731,094 A | 1/1956 | Hine | |
| 4,958,289 A | 9/1990 | Sum | |
| 5,165,240 A * | 11/1992 | Page | B64D 31/00 701/100 |
| 5,315,819 A * | 5/1994 | Page | F02C 9/28 60/39.282 |
| 9,366,147 B2 | 6/2016 | Gallet | |
| 9,623,958 B2 | 4/2017 | Martin Moreno et al. | |
| 9,821,901 B2 | 11/2017 | Duke et al. | |
| 2016/0121998 A1* | 5/2016 | Martin Moreno | B64C 11/46 701/3 |

FOREIGN PATENT DOCUMENTS

EP 3018054 5/2016

* cited by examiner

*Primary Examiner* — Adam D Tissot
*Assistant Examiner* — Garrett F Evans
(74) *Attorney, Agent, or Firm* — Norton Rose Fulbright Canada LLP

(57) ABSTRACT

Herein provided are methods and systems for producing reverse thrust in a multi-engine propeller aircraft, comprising: obtaining, at a first engine controller of a first engine of the aircraft, a first power request for the first engine for producing reverse thrust; determining, at the first engine controller, a first blade angle for a first propeller coupled to the first engine; obtaining, at the first engine controller and from a second engine controller of a second engine of the aircraft, a second power request for the second engine and a second blade angle for a second propeller coupled to the second engine; and when the second power request is indicative of a request for producing reverse thrust and when the first and second blade angles are beyond a predetermined threshold, commanding, via the first engine controller, the first engine to produce reverse thrust based on the first power request.

20 Claims, 6 Drawing Sheets

REVERSE THRUST IN MULTI-ENGINE PROPELLER AIRCRAFT

TECHNICAL FIELD

The present disclosure relates generally to propeller control, and more particularly to the production of reverse thrust via variable pitch propellers.

BACKGROUND OF THE ART

Multi-engine propeller aircraft consists of two or more so-called "powerplants", each composed of two principal and distinct components: an engine and a propeller. Typically, a multi-engine propeller aircraft will consist of any number of powerplants, which can be evenly disposed on either side of a fuselage of the aircraft and/or within the fuselage itself. Control of the engines and propellers can be effected separately or jointly via controls available within a cockpit or other control structure of the aircraft.

During certain manoeuvres, it can be desirable to have the powerplants produce reverse thrust—that is to say, thrust which generally opposes the heading of the aircraft. In the case of propeller-driven aircraft, this can be accomplished by altering a pitch of the propeller blade, also referred to as a propeller blade angle. By changing the propeller blade angle beyond a transition point, the thrust produced by rotation of the propeller can be reversed. The transition from forward- to reverse-thrust propeller blade angles can require synchronisation of the transition for all propellers of the aircraft. If this transition is not sufficiently synchronized, the reverse thrust may not be produced evenly, which can result in yawing or other undesirable behaviours for the aircraft. Traditional approaches require careful pilot coordination, but are subject to pilot error, and can be complex.

As such, there is room for improved techniques for producing reverse thrust.

SUMMARY

In accordance with a broad aspect, there is provided a method for producing reverse thrust in a multi-engine propeller aircraft, comprising: obtaining, at a first engine controller of a first engine of the aircraft, a first power request for the first engine, the first power request for producing reverse thrust; determining, at the first engine controller, a first blade angle for a first propeller, the first propeller coupled to the first engine; obtaining, at the first engine controller and from a second engine controller of a second engine of the aircraft, a second power request for the second engine and a second blade angle for a second propeller, the second propeller coupled to the second engine; and when the second power request is indicative of a request for producing reverse thrust and when the first and second blade angles are beyond a predetermined threshold, commanding, via the first engine controller, the first engine to produce reverse thrust based on the first power request.

In some embodiments, the first and second power requests are based on respective first and second power lever angles for the first and second engines.

In some embodiments, the first and second power lever angles are indicative of a ground idle position.

In some embodiments, the first and second power lever angles are indicative of a reverse position.

In some embodiments, the method further comprises providing, to the second engine controller, the first power request.

In some embodiments, the method further comprises providing, to the second engine controller, the first blade angle.

In some embodiments, the method further comprises commanding, via the first engine controller, a change in the first blade angle of the first propeller beyond the predetermined threshold.

In some embodiments, commanding, via the first engine controller, a change in the first blade angle comprises issuing a command from the first engine controller to an actuator of the first propeller.

In some embodiments, wherein the first blade angle is different from the second blade angle.

In accordance with another broad aspect, there is provided a controller for producing reverse thrust in a multi-engine propeller aircraft, comprising: a processing unit; and a non-transitory computer-readable medium coupled to the processing unit and comprising computer-readable program instructions executable by the processing unit for: obtaining a first power request for a first engine of the aircraft, the first power request for producing reverse thrust; determining a first blade angle for a first propeller, the first propeller coupled to the engine; obtaining, from a second engine controller of a secondary engine of the aircraft, a second power request for the secondary engine and a second blade angle for a second propeller, the second propeller coupled to the secondary engine; and when the second power request is indicative of a request for producing reverse thrust and when the first and second blade angles are beyond a predetermined threshold, commanding the first engine to produce reverse thrust based on the first power request.

In some embodiments, the first and second power requests are based on respective first and second power lever angles for the first and second engines.

In some embodiments, the first and second power lever angles are indicative of a ground idle position.

In some embodiments, the first and second power lever angles are indicative of a reverse position.

In some embodiments, the program instructions are further executable for providing, to the second engine controller, the first power request.

In some embodiments, the program instructions are further executable for providing, to the second engine controller, the first blade angle.

In some embodiments, commanding, via the first engine controller, a change in the first blade angle to cause the first propeller to produce reverse thrust comprises issuing a command from the first engine controller to a first propeller controller of the first propeller.

In some embodiments, the program instructions are further executable for commanding, via the first engine controller, a change in the first blade angle of the first propeller beyond the predetermined threshold.

In some embodiments, the first blade angle is different from the second blade angle.

In accordance with a further broad aspect, there is provided a system for producing reverse thrust in a multi-engine aircraft, comprising a first engine controller for a first engine of the aircraft, the first engine controller configured for: obtaining a first power request for the first engine for producing reverse thrust; and determining a first blade angle for a first propeller, the first propeller coupled to the first engine. The system further comprises a second engine controller for a second engine of the aircraft, the second engine controller communicatively coupled to the first engine controller and configured for: obtaining a second power request for the second engine for producing reverse thrust; determining a second blade angle for a second propeller, the second propeller coupled to the second engine; obtaining, from the first engine controller, the first power request for the first engine and the first blade angle for the first propeller; and when the first power request is indicative of a request for producing reverse thrust and when the first and second blade angles are beyond a predetermined threshold, commanding, via the first engine controller, the first engine to produce reverse thrust based on the second power request.

In some embodiments, the first and second power requests are based on respective first and second power lever angles for the first and second engines.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
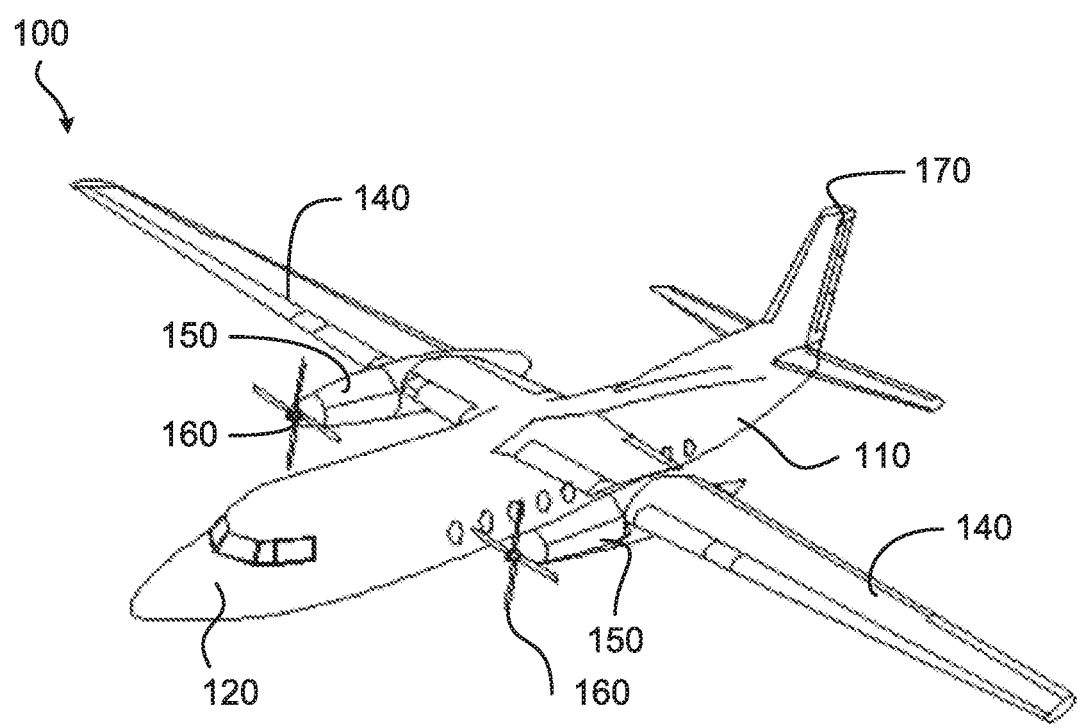
FIG. 1 is a perspective view of an example multi-engine aircraft.

With reference to FIG. 1, an aircraft 100 is illustrated, having a fuselage 110, a pair of wings 140 (or more), engines 150, propellers 160, and a tail 170. The aircraft 100 may be any suitable aircraft—such as corporate, private, commercial, or the like—which includes multiple engines 150 and propellers 160. Collectively, an engine-propeller pair may be referred to as a "powerplant". The fuselage 110 has a cockpit 120, which can be positioned at any suitable location on the aircraft 100, for example at a front portion of the fuselage 110. The cockpit 120 is configured for accommodating one or more pilots who control the aircraft 100 by way of one or more operator controls. The operator controls can include any suitable number of pedals, yokes, steering wheels, centre sticks, flight sticks, levers, knobs, switches, and the like. Although two engines 150 are illustrated, it should be understood that the aircraft 100 can have any suitable number of engines, for example four, six, eight, and the like.

The engines 150 effect rotational motion in the propellers 160, which in turn produce thrust via propeller blades, causing the aircraft 100 to be displaced. The propellers blades are configured for assuming a propeller blade angle, which varies both the magnitude and direction of the thrust produced by the propellers 160. The propeller blade angle is indicative of an orientation of the blades of the propellers 160 relative to a particular reference angle. For example, a positive propeller blade angle can cause the propellers 160 to produce forward thrust, that is to say, thrust which displaces the aircraft 100 in a direction aligned with the heading of the aircraft 100. Increasing the propeller blade angle to a larger positive value can further increase the amount of forward thrust produced. Conversely, a negative propeller blade angle can cause the propellers 160 to produce reverse thrust, which is substantially opposite positive thrust, and a larger negative value for the propeller blade angle can cause an increase in the amount of reverse thrust produced.

In certain circumstances, for example during landing, it can be desired to transition the propeller blades from a blade angle which produces forward thrust to a subsequent blade angle which produces reverse thrust. If this transition is not performed substantially synchronously across the different engines 150 and propeller 160, the aircraft 100 can experience unwanted behaviors. For example, for an aircraft like the aircraft 100 in FIG. 1, if the engine 150 on one side of the aircraft 100 transitions to producing reverse thrust later than the engine 150 on the other side of the aircraft 100, the aircraft 100 can yaw, which can complicate the ability of an operator of the aircraft 100 to maintain a desired trajectory for the aircraft.

Figure 2A:
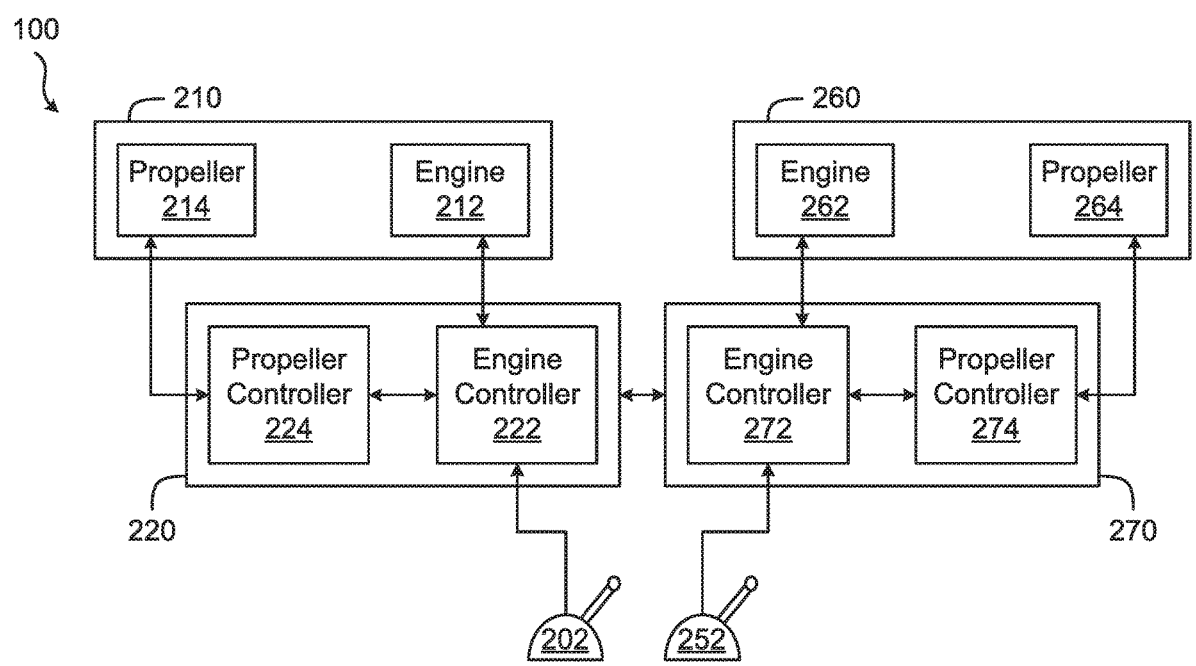
FIGS. 2A-B are block diagrams of example configurations of control systems for the multi-engine aircraft of FIG. 1.

With reference to FIG. 2A, a schematic illustration of the aircraft 100 is provided. The aircraft is composed of two powerplants 210, 260, each being constituted of an engine 212, 262, and a propeller 214, 264. The powerplants 210, 260 are controlled by respective powerplant controllers 220, 270, each being constituted of an engine controller 222, 272, and a propeller controller 224, 274. The powerplant controllers 220, 270 are configured for being communicatively coupled to one another. In some embodiments, the engine controllers 222 and 272 are communicatively coupled. In other embodiments, each one of the engine controllers 222, 272 is communicatively coupled to the propeller controller of the other powerplant: the engine controller 222 can be communicatively coupled to the propeller controller 274, and the engine controller 272 can be communicatively coupled to the propeller controller 224. Still other embodiments are considered.

Focusing on the powerplant 210 and the controller 222, the engine controller 222 is configured for exacting control of the engine 212, and the propeller controller 224 is configured for exacting control of the propeller 214. In addition, the engine 212 and the propeller 214 can be provided with one or more sensors for providing information to their respective controllers 222, 224. These sensors can include speed sensors, torque sensors, acceleration sensors, propeller blade angle sensors, and the like. The coupling between the engine 212 and the engine controller 222, and between the propeller 214 and the propeller 224, can be effected in any suitable way, using any suitable wired, wireless, or mixed communication techniques.

In addition, the engine controller 222 is configured for receiving a first power request from a pilot input 202. The pilot input 202 can be a power lever or similar control device, and the first power request can take the form of a power lever angle. In some cases, the power lever is provided with a plurality of settings, including a maximum takeoff setting, a flight idle setting, a ground idle setting, and a reverse thrust setting, each associated with respective power lever angles. The pilot input 202 can provide a signal to the engine controller 222 which indicates the power lever angle, and the engine controller can interpret the signal to determine one or more engine settings for the engine 212.

Moreover, the propeller controller 224 and the engine controller 222 are configured for exchanging information. For instance, the propeller controller 224 can obtain, from the propeller 214, a value for the blade angle for the propeller 214, and can provide the engine controller 222 with this value. Other information can also be exchanged between the engine controller 222 and the propeller controller 224, as appropriate.

It should be understood that each of the interactions discussed hereinabove with respect to the powerplant 210, the powerplant controller 220, and the pilot input 202, are analogous to the interactions which can take place between the powerplant 260, the powerplant controller 270, and the pilot input 252. Additionally, in some embodiments the pilot inputs 202, 252 are separate inputs, for example separate power levers. In still further embodiments, the pilot inputs 202, 252 can each represent multiple inputs, for instance both a power lever and a propeller-related lever, which can be used to adjust the propeller blade angle, to adjust a propeller speed setting, to command the propeller 214 or 264 to feather, and the like. In some embodiments, one or both of the pilot inputs 202, 252 include buttons, switches, dials, or other discrete-type input mechanisms. Also, although the foregoing discussion has focused on the aircraft 100 which includes two powerplants 210, 260, it should be understood that the methods and systems described herein can be applicable to aircraft which include more than two powerplants, in cases where each of the powerplants is provided with an individual powerplant controller, or in any other suitable situation.

Under certain flight and/or ground handling conditions, the engine controller 222 can receive, via the pilot input 202, a request for the powerplant 210 to produce reverse thrust. For example, in cases in which the pilot input 202 is a power lever, a signal indicating that the power lever angle is set at a "reverse thrust" setting can be received by the engine controller 222. In another example, the signal indicates that the power lever angle is set at a "ground idle" setting. Other settings are also considered. In some embodiments, the request to produce reverse thrust is based on a transition from the "ground idle" setting to a "reverse thrust" setting. In still further embodiments, the request to produce reverse thrust involves a request to increase an amount of thrust produced by the powerplant 210, for example an increase in the amount of reverse thrust to be produced. Still other embodiments of the request to produce reverse thrust are considered.

In order to produce reverse thrust, the blades of the propeller 214 are caused to transition to a blade angle suitable for producing reverse thrust (herein referred to as a "negative blade angle", although other nomenclatures are also considered). The transition to the negative blade angle for the blades of the propeller 214 can be effected via the propeller controller 224, which can command actuators or other systems within the propeller 214 to cause the blades of the propeller 214 to assume the negative blade angle. However, as discussed hereinabove, in order to avoid yawing or other undesirable behaviours for the aircraft 100, the transition to the negative blade angle for the blades of the propeller 214 should be substantially synchronous with a transition to the negative blade angle for the blades of the propeller 264. Although it can be desirable for the transition for the blades of both propeller 214, 264 to occur substantially synchronously, it should be noted that the blades of the propellers 214, 264 do not need to transition to the same negative blade angle. In other words, the blades of the propellers 214, 264 can be caused to transition to different negative blade angles substantially synchronously, and mismatches between the negative blade angles can be tolerated. For example, a mismatch between the negative blade angles for propellers 214, 264 can be countered by commanding a tail rudder of the aircraft 100 to compensate for the mismatch. Other approaches are also considered.

In order to achieve the substantially synchronous transition to the negative blade angle, the engine controller 222 obtains the request to produce reverse thrust, and also obtains the propeller blade angle for the propeller 214. In some embodiments, the propeller controller 224 can provide the propeller blade angle for the propeller 214 to the engine controller 222 in a substantially continuous and/or real-time fashion. In other embodiments, the engine controller 222 can periodically request the propeller blade angle for the propeller 214 from the propeller controller 224, or can request the propeller blade angle for the propeller 214 in response to a particular event, for instance in response to receiving the request to produce reverse thrust.

In addition, the engine controller 222 obtains, from the powerplant controller 270, a propeller blade angle for the propeller 264 and an indication of whether the engine controller 272 has also received a request to produce reverse thrust. In order to ensure synchronicity between the propellers 214 and 264, the engine controller 222 and 272 will wait until both engine controllers 222, 272 have been requested to produce reverse thrust, and until the propeller blades for both propellers 214, 264 are at a blade angle suitable for producing reverse thrust, for example beyond a predetermined threshold value.

Thus, in some embodiments, the engine controller 222 evaluates whether the propeller blade angle for both propellers 214, 264 is beyond the predetermined threshold value. The threshold value can be indicative of an angle beyond which is it deemed safe to begin the production of reverse thrust. For example, the threshold value can be associated with a "low beta" angle for blades of the propellers 214, 264. In another example, the threshold value is substantially similar to a neutral angle for the blades of the propellers 214, 264. It should be noted that the term "beyond", in this context, can be understood to be above the threshold value, below the threshold value, approximately at the threshold value, or any other indication that the blade angle of the propellers 214, 264, are suitable for producing reverse thrust.

When the engine controller 222 has obtained a request to produce reverse thrust from the pilot input 202, when the engine controller 222 has confirmed that the engine controller 272 has also received a request to produce reverse thrust, and when the engine controller 222 has confirmed that the blades of the propellers 214, 264 are at respective propeller blade angles that are beyond the threshold value, the engine controller 222 can implement the request to produce reverse thrust. This can include commanding the engine 212 to increase an output torque to the propeller 214, instructing the propeller controller 224 to command actuators within the propeller 214 to rotate the blades of the propeller 214, for example to a larger negative blade angle, and the like. The engine controller 272 can perform similar operations, including: obtaining a request to produce reverse thrust from the pilot input 252, validating that the engine controller 222 has also received a request to produce reverse thrust, and validating that the blades of the propellers 214, 264 are at respective propeller blade angles that are beyond the threshold value. Once the engine controller 272 has ascertained that these conditions are met, the engine controller 272 can implement the request to produce reverse thrust, which can include commanding the engine 262 to increase an output torque to the propeller 264, instructing the propeller controller 274 to command actuators within the propeller 264 to rotate the blades of the propeller 264, for example to a larger negative blade angle, and the like.

In this fashion, each engine controller 222, 272 independently verifies that both powerplants 210, 260 are prepared for producing reverse thrust before implementing the request to produce reverse thrust. This synchronization of the request to produce reverse thrust between the engine controllers 222, 272 can contribute to reducing undesirable yawing or other behaviours. In addition, because the engine controllers 222, 272 are communicatively coupled to one another, allowing for cross-talk therebetween, there is no need for a central controller or avionics system to arbitrate the requests for producing reverse thrust.

Figure 2B:
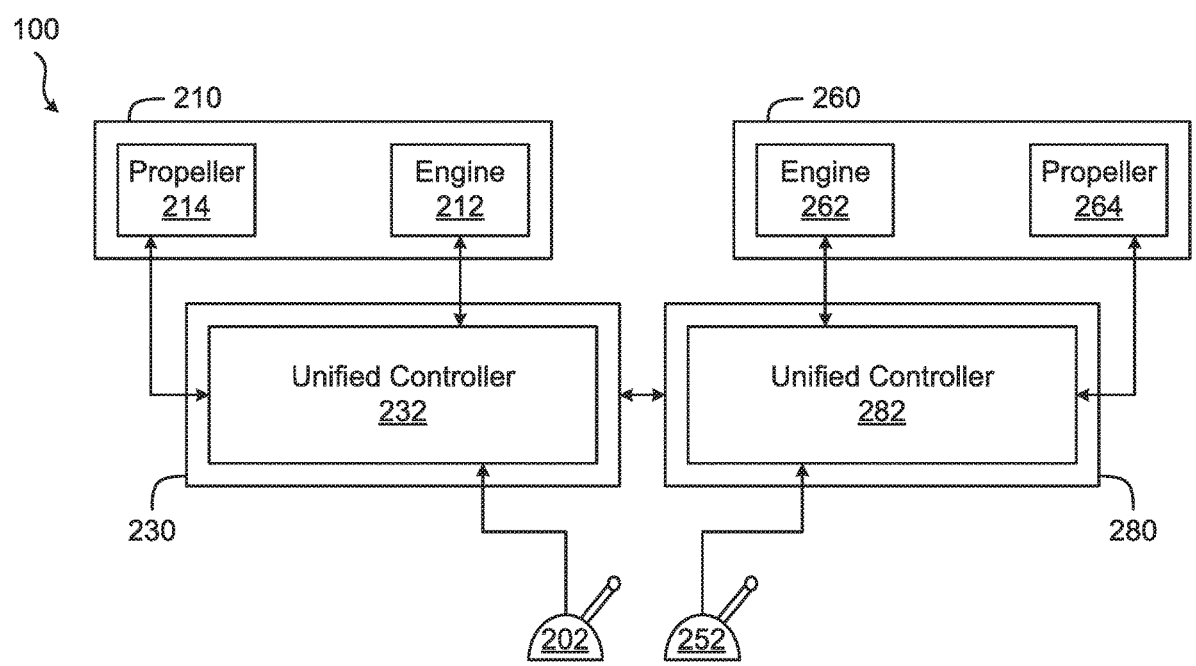

With reference to FIG. 2B, in some embodiments the powerplant controllers 220, 270 are replaced with powerplant controllers 230, 280, each composed of a unified controller 232, 282. The unified controllers 232, 282 are configured for implementing the functionality of both an engine controller and a propeller controller: for example, the unified controller 232 can implement the functionality of the engine controller 222 and of the propeller controller 234. In this embodiment, the powerplant controllers 230, 280 are communicatively coupled, for example by communicatively coupling the unified controllers 232, 282.

Figure 3:
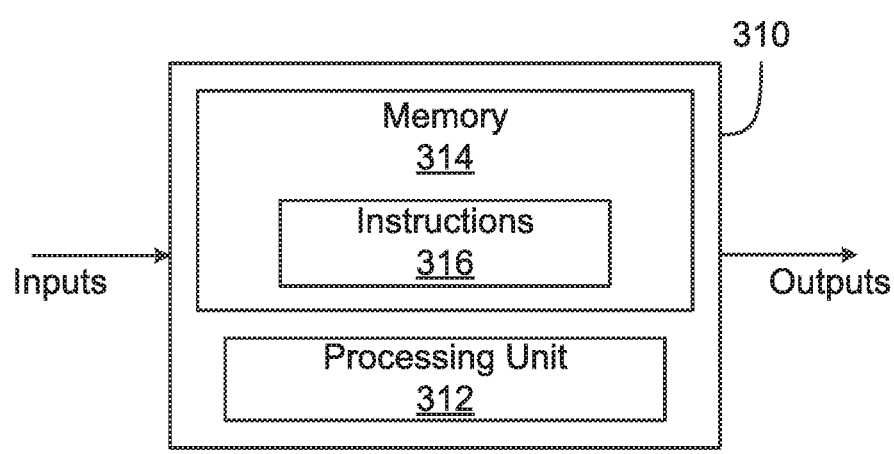
FIG. 3 is a schematic diagram of an example computing system for implementing the control systems of FIGS. 2A-B, in accordance with an embodiment.

With reference to FIG. 3, one or more of the engine controllers 210, 260, the propeller controllers 220, 270, and/or the unified controllers 230, 280, may be implemented by a computing device 310, comprising a processing unit 312 and a memory 314 which has stored therein computer-executable instructions 316. The processing unit 312 may comprise any suitable devices configured to implement the system 300 such that instructions 316, when executed by the computing device 310 or other programmable apparatus, may cause the functions/acts/steps of the method 400 as described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

In some embodiments, the computing device 310 can include one or more full-authority digital engine controls (FADEC), one or more propeller electronic control (PEC) units, and the like. In some embodiments, the engine controllers 210, 260 are implemented as dual-channel FADECs. In other embodiments, the engine controllers 210, 260 are implemented as two separate single-channel FADECs. Additionally, in some embodiments the propeller controllers 220, 270 are implemented as dual-channel PECs, or as two single-channel PECs, or any suitable combination thereof. The unified controllers 230, 280 can be implemented as any suitable combination of FADECs, PECs, and/or any other suitable control devices.

Figure 4:
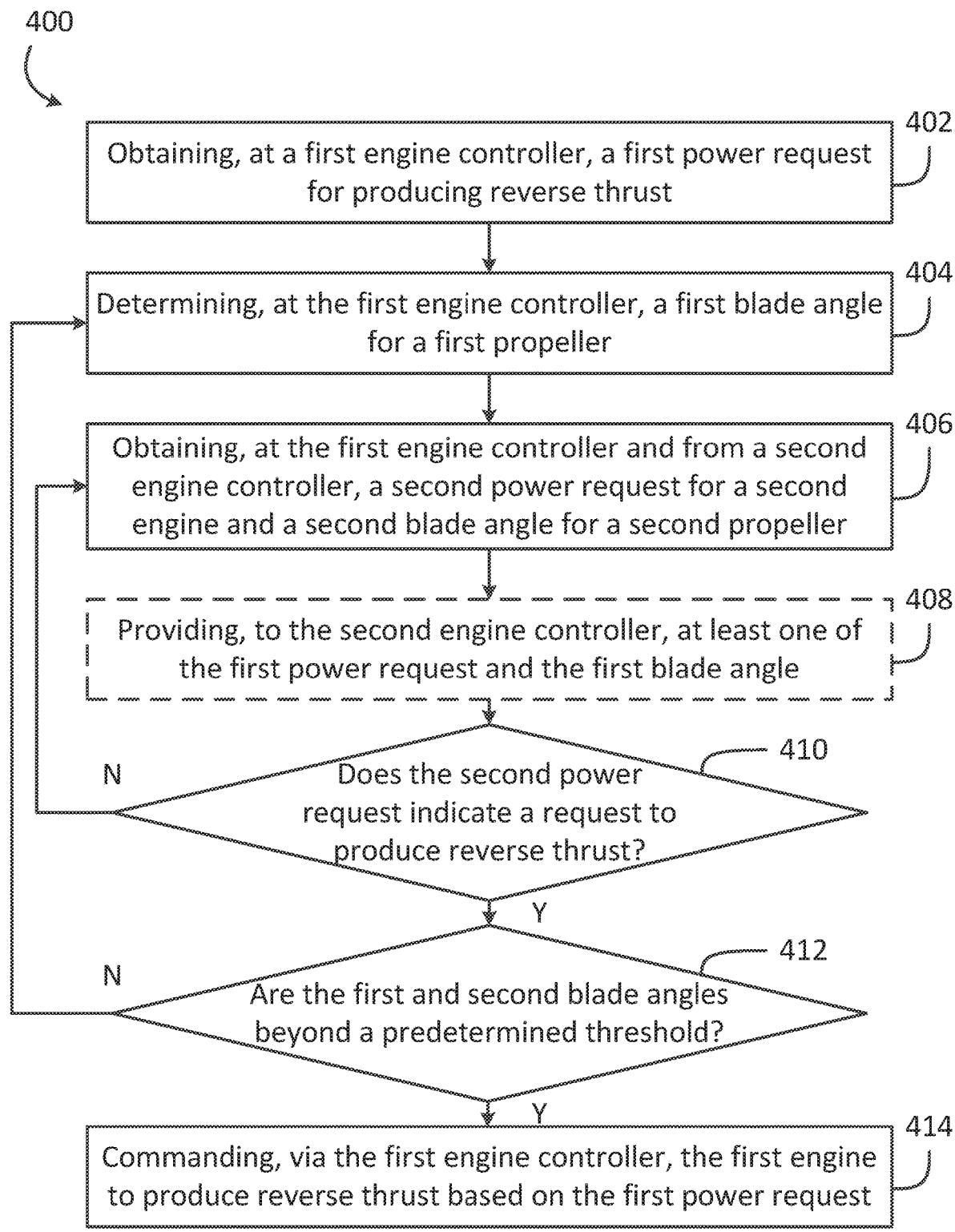
FIG. 4 is a flowchart illustrating an example method for producing reverse thrust in a multi-engine aircraft in accordance with an embodiment.

With reference to FIG. 4, there is shown a flowchart illustrating an example method 400 for producing reverse thrust in a multi-engine propeller aircraft, for example the aircraft 100. At step 402, a first power request is obtained at a first engine controller, for example the engine controller 222. The first power request can be indicative of a request for the engine 212, or the powerplant 210 generally, to produce reverse thrust. The first power request can be obtained by the first engine controller in any suitable way, for example from an avionics system, from a pilot input, for example pilot inputs 202, 252, and the like.

At step 404, a first blade angle for a first propeller, for example the propeller 214, can be determined at the engine controller 222. In some embodiments, the engine controller 222 can determine the first blade angle by requesting information from a propeller controller, for example the propeller controller 224. In other embodiments, the engine controller 222 can obtain the first blade angle from a sensor associated with the propeller 214. In further embodiments, the engine controller can be a unified controller, for example the unified controller 232, which can have already obtained the first blade angle for the propeller 214. Still other embodiments are considered.

At step 406, a second power request and a second blade angle are obtained at the first engine controller from a second engine controller, for example the engine controller 272. The second power request can be indicative of a request to produce reverse thrust for a second engine, for example the engine 262, or the powerplant 260 generally. The engine controller 272 can obtain the second power request and the second blade angle in any suitable way, and can provide them in turn to the engine controller 222 in any suitable fashion.

Optionally, at step 408, the first power request and the first propeller blade angle (for the propeller 214) can be provided to the second engine controller, e.g. engine controller 272, for example by the engine controller 222. This can allow the engine controller 272 to implement the same method 400, to ensure synchronicity when producing reverse thrust in the aircraft 100.

At decision step 410, a determination is made regarding whether the second power request, obtained from the engine controller 272, indicates a request to produce reverse thrust. If the second power request does not indicate a request to produce reverse thrust, the method 400 can return to some previous step, for example step 402. If the second power request does indicate a request to produce reverse thrust, the method 400 proceeds to decision step 412. At decision step 412, a determination is made regarding whether the first and second blade angles are beyond a predetermined threshold. As discussed hereinabove, the predetermined threshold can be indicative of a blade angle suitable for a transition to a negative blade angle, in order to produce reverse thrust. If the first and second blade angles are not beyond the predetermined threshold, the method 400 can return to some previous step, for example step 402. If the first and second blade angles are beyond the predetermined threshold, the method 400 proceeds to step 414.

At step 414, the engine 212 is commanded to produce reverse thrust, for example via the engine controller 222. In some embodiments, commanding the engine 212 to produce reverse thrust includes a command to increase a level of thrust production of the engine 212. Additionally, in some embodiments, the engine controller 222 instructs the propeller controller 224 to command actuators of the propeller 214 to rotate the blades of the propeller 214 to a negative blade angle. In other embodiments, the unified controller 232 commands the actuators of the propeller 214 to rotate the blades of the propeller 214 to a negative blade angle. Still other embodiments are considered.

Figure 5:
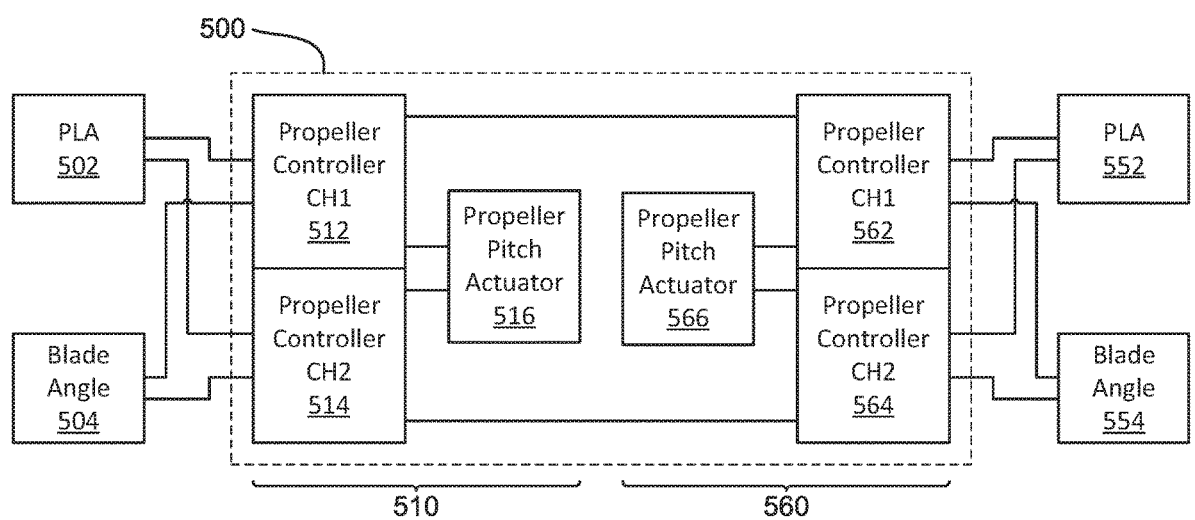
FIG. 5 is a schematic diagram of an example implementation of the control system of FIG. 2B.

With reference to FIG. 5, a particular embodiment of a propeller control system 500 is illustrated, for example for controlling at least part of the operation of the aircraft 100. The control system 500 is composed of first and second propeller control modules 510, 560, and is configured for receiving inputs associated with a power lever angle (PLA) via inputs 502, 552, and associated with a blade angle via inputs 504, 554.

In this embodiment, the control module 510 is composed of first and second propeller controllers 512, 514, illustrated here as belonging to first and second channels (CH1, CH2), and a propeller pitch actuator 516. Although the embodiment shown in FIG. 5 uses a dual-channel approach, which can provide additional redundancy, it should be understood that a single-channel approach is also considered. Similarly, the control module 560 is composed of first and second propeller controllers 562, 564, belonging to first and second channels (CH1, CH2) and a propeller pitch actuator 566. In addition, it should be noted that in this embodiment, the PLA 502, 552 and blade angle 504, 554 inputs are shown as being provided substantially directly to the propeller controllers 512, 514, but other embodiments are also considered. For example, the PLA 502, 552 and blade angle 504, 554 inputs can be provided to the propeller controllers 512, 514 via engine controllers, or any other suitable intermediary.

The propeller controllers 512, 514 are configured for each receiving the PLA and blade angle for a first engine and first propeller via inputs 502, 504, and the propeller controllers 562, 564 are configured for each receiving the PLA and blade angle for a second engine and second propeller via inputs 552, 554. In addition, the propeller controllers 512, 514, 562, 564 are communicatively coupled to one another on a per-channel basis in order to provide cross-talk between the propeller controllers 512, 514, 562, 564. For example, propeller controllers 512, 562 can be communicatively coupled together, and propeller controllers 514, 564 can be communicatively coupled together. In this fashion, the propeller controllers 512, 562, and 514, 564, can exchange information relating to received request for producing reverse thrust, propeller blade angles, and the like, in order to ensure the synchronized production of reverse thrust in the aircraft 100.

It should be noted that although the foregoing discussion has focused on control of the powerplants 210, 260, via various engine, propeller, and/or unified controllers, alternative embodiments are also considered. For example, control of the powerplants 210, 260, can be effected via avionics systems or other similar control systems of the aircraft 100.

The methods and systems for producing reverse thrust in a multi-engine propeller aircraft described herein may be implemented in a high level procedural or object oriented programming or scripting language, or a combination thereof, to communicate with or assist in the operation of a computer system, for example the computing device 300. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 312 of the computing device 310, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to illustrate examples only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for producing reverse thrust in a multi-engine propeller aircraft, comprising:
   obtaining, at a first engine controller of a first engine of the aircraft, a first power request for the first engine to produce reverse thrust;
   determining, at the first engine controller, a first blade angle for a first propeller coupled to the first engine, the first blade angle determined to assess, at the first engine controller, a readiness of the first engine for producing reverse thrust based on the first power request;
   obtaining, at the first engine controller and from a second engine controller of a second engine of the aircraft, a second power request for the second engine to produce reverse thrust, the first engine controller and the second engine controller communicatively coupled to one another without being arbitrated by a central controller;
   obtaining, at the first engine controller and from the second engine controller, a second blade angle for a second propeller coupled to the second engine, the second blade angle obtained to assess, at the first engine controller, the readiness of the second engine for producing reverse thrust based on the second power request;

providing, to the second engine controller and from the first engine controller, the first power request and the first blade angle, the first blade angle used by the second engine controller to assess the readiness of the first engine for producing reverse thrust based on the first power request, and when the first and second blade angles are beyond a predetermined threshold, commanding, via the first engine controller, the first engine to produce reverse thrust based on the first power request and substantially synchronously, commanding, via the second engine controller, the second engine to produce reverse thrust based on the second power request.

2. The method of claim 1, wherein the first and second power requests are based on respective first and second power lever angles for the first and second engines.

3. The method of claim 2, wherein the first and second power lever angles are indicative of a ground idle position.

4. The method of claim 2, wherein the first and second power lever angles are indicative of a reverse position.

5. The method of claim 1, further comprising providing, to the second engine controller, the first power request.

6. The method of claim 1, further comprising providing, to the second engine controller, the first blade angle.

7. The method of claim 1, further comprising commanding, via the first engine controller, a change in the first blade angle of the first propeller beyond the predetermined threshold.

8. The method of claim 7, wherein commanding, via the first engine controller, a change in the first blade angle comprises issuing a command from the first engine controller to an actuator of the first propeller.

9. The method of claim 1, wherein the first blade angle is different from the second blade angle.

10. A controller of a first engine of a multi-engine propeller aircraft, the controller for producing reverse thrust in the aircraft, the controller comprising:
a processing unit; and
a non-transitory computer-readable medium coupled to the processing unit and comprising computer-readable program instructions executable by the processing unit for:
obtaining a first power request for a first engine of the aircraft, the first power request for producing reverse thrust;
determining a first blade angle for a first propeller coupled to the first engine, the first blade angle determined to assess, at the controller of the first engine, a readiness of the first engine for producing reverse thrust based on the first power request;
obtaining, from a controller of a second engine of the aircraft, a second power request for the second engine to produce reverse thrust, the controller of the first engine and the controller of the second engine communicatively coupled to one another without being arbitrated by a central controller;
obtaining, from the controller of the second engine, a second blade angle for a second propeller coupled to the second engine, the second blade angle obtained to assess, at the controller of the first engine, the readiness of the second engine for producing reverse thrust based on the second power request;
providing, to the controller of the second engine and from the controller of the first engine, at least one of the first power request and the first blade angle, the first blade angle used by the second engine controller to assess the readiness of the first engine for producing reverse thrust based on the first power request; and
when the first and second blade angles are beyond a predetermined threshold, commanding, via the engine controller of the first engine, the first engine to produce reverse thrust based on the first power request, and substantially synchronously, commanding, via the controller of the second engine, the second engine to produce reverse thrust based on the second power request.

11. The controller of claim 10, wherein the first and second power requests are based on respective first and second power lever angles for the first and second engines.

12. The controller of claim 11, wherein the first and second power lever angles are indicative of a ground idle position.

13. The controller of claim 11, wherein the first and second power lever angles are indicative of a reverse position.

14. The controller of claim 10, wherein the program instructions are further executable for providing, to the second engine controller, the first power request.

15. The controller of claim 10, wherein the program instructions are further executable for providing, to the second engine controller, the first blade angle.

16. The controller of claim 10, wherein the program instructions are further executable for commanding, via the controller of the first engine, a change in the first blade angle to cause the first propeller to produce reverse thrust comprises issuing a command from the controller of the first engine to a first propeller controller of the first propeller.

17. The controller of claim 10, further comprising commanding, via the controller of the first engine, a change in the first blade angle of the first propeller beyond the predetermined threshold.

18. The controller of claim 10, wherein the first blade angle is different from the second blade angle.

19. A system for producing reverse thrust in a multi-engine aircraft, comprising:
a first engine controller for a first engine of the aircraft, the first engine controller configured for:
obtaining a first power request for the first engine to produce reverse thrust; and
determining a first blade angle for a first propeller coupled to the first engine, the first blade angle determined to assess, at the first engine controller, a readiness of the first engine for producing reversed thrust based on the first power request; and
a second engine controller for a second engine of the aircraft, the first engine controller and the second engine controller communicatively coupled to one another without being arbitrated by a central controller, the second engine controller configured for:
obtaining a second power request for the second engine to produce reverse thrust;
determining a second blade angle for a second propeller coupled to the second engine, the second blade angle determined to assess, at the first engine controller, a readiness of the second engine for producing reverse thrust based on the second power request;
obtaining, from the first engine controller, the first power request for the first engine and the first blade angle for the first propeller, the first blade angle used by the second engine controller to assess the readiness of the first engine fro producing reverse thrust based on the first power request; and when the first and second blade angles are beyond a predetermined threshold, commanding, via the second engine controller, the second engine to produce reverse thrust based on the second power request, and substantially synchronously, commanding, via the first engine controller, the first engine to produce reverse thrust based on the first power request.

20. The system of claim 19, wherein the first and second power requests are based on respective first and second power lever angles for the first and second engines.

\* \* \* \* \*